Figure 1:
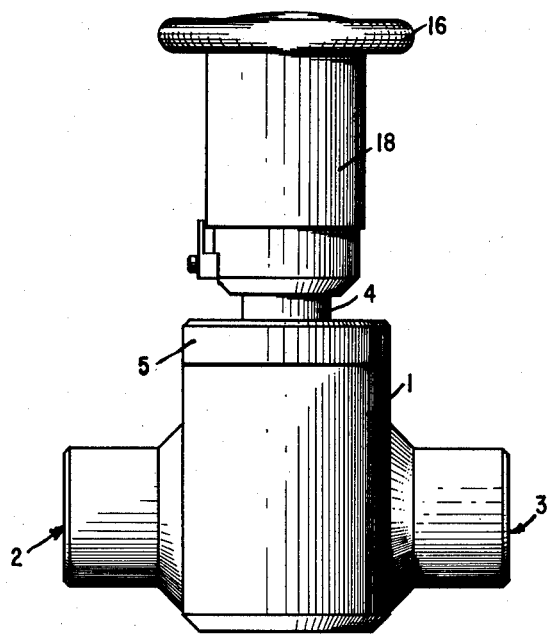

March 12, 1963  R. P. DUMM  3,081,062
BALANCE PRESSURIZED SEAL GLOBE VALVE
Filed Oct. 3, 1960  3 Sheets-Sheet 1

INVENTOR
ROBERT P. DUMM.
BY
ATTORNEY.

March 12, 1963  R. P. DUMM  3,081,062
BALANCE PRESSURIZED SEAL GLOBE VALVE
Filed Oct. 3, 1960  3 Sheets-Sheet 2

INVENTOR.
ROBERT P. DUMM.
BY
ATTORNEY.

March 12, 1963  R. P. DUMM  3,081,062
BALANCE PRESSURIZED SEAL GLOBE VALVE
Filed Oct. 3, 1960  3 Sheets-Sheet 3

INVENTOR.
ROBERT P. DUMM.
BY
ATTORNEY.

United States Patent Office 3,081,062
Patented Mar. 12, 1963

3,081,062
BALANCE PRESSURIZED SEAL GLOBE VALVE
Robert P. Dumm, Long Beach, Calif., assignor to Pacific Valves, Inc., Long Beach, Calif., a corporation of California
Filed Oct. 3, 1960, Ser. No. 60,002
4 Claims. (Cl. 251—175)

This invention relates to a balance pressurized seal globe valve, and particularly a valve through which a compressible fluid passes, such as various gases under high pressure. By globe valve is meant the various types of valves known as plug, gate, wedge, check, and the like.

An object of my invention is to provide a novel valve of the type stated which will be completely balanced and can be either opened or closed with very little manual force, and also where the valve has a seat-disc combination that can be used for pressure sealing. My valve will work effectively under high gas pressures, for example, from 2000 p.s.i., to in excess of 6000 p.s.i.

Another object of my invention is to provide a novel balanced valve in which relative small manual force is required to initially open the valve (termed cracking); also to completely open the valve, also to effectively seat the valve in the closing operation, particularly the movement from the initial light contact of the valve on its seat and until the valve is tightly seated and closed.

Another object of my invention is to provide a valve of the globe type which is in perfect balance, and in the closed position the seat is pressurized to insure complete sealing free of an leakage. The seat includes a plastic insert in the disc assembly which is pressurized by a differential pressure. This differential pressure is created between the top and bottom of the plastic insert. The differential pressure is obtained as a result of a difference in area between the top and bottom of the plastic insert. The pressure on top of the insert is the highest and, consequently, tends to hold the plastic insert on its seat.

Still another object of my invention is to provide a novel valve of the character stated, in which a stem packing is provided which will effectively prevent leakage at this point under a high pressure flow through the valve.

My valve, therefore, includes the following features:
(1) A perfect balance for low running torque values.
(2) A pressurized disc seal so that the pressure in the valve or line itself contains the seal after the initial contact of the disc and seat ring.
(3) Low seating torque values inclosing the valve.
(4) Low breakaway torque values in opening the valve.
(5) Nonturning, nonrotating stem and disc.
(6) A bonnet nut which does not absorb any of the pressure forces.
(7) A disc sleeve which has two primary functions, to guide the disc and to hold the steel seat ring in place.
(8) An angular ball bearing race on the stem pin, which race absorbs both radial and thrust forces.

Another object of my invention is to provide a novel seating ring and disc combination which will comply with the strict cleanliness requirements of a high pressure valve which controls certain gases (such as those in the missile industry).

Other objects, advantages and features of invention may appear from the accompanying drawing, the subjoined detailed description and the appended claims.

Figure 4:
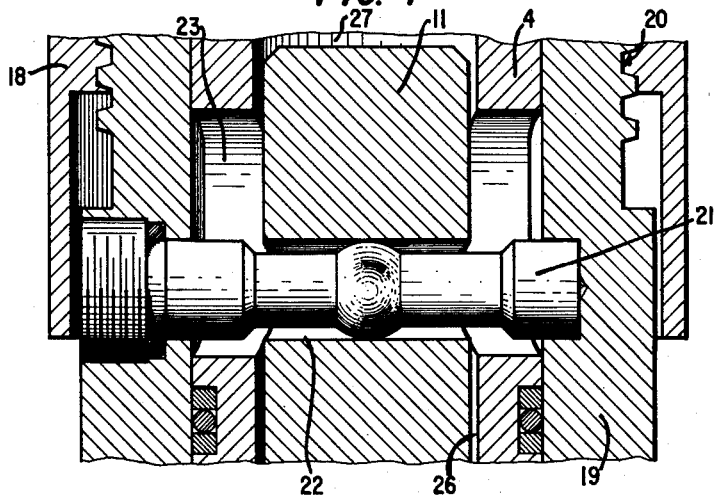
Figure 2:
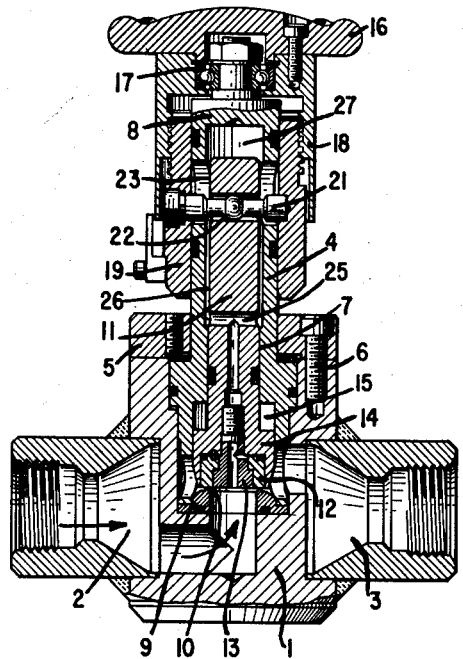
Figure 3:
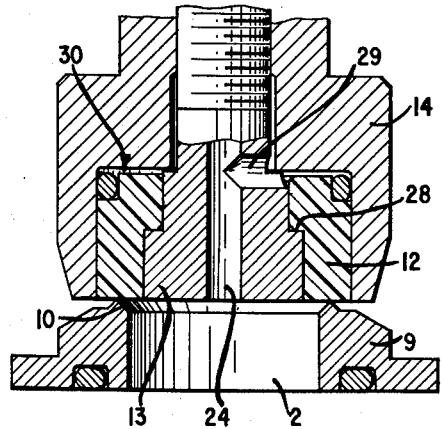
Figure 5:
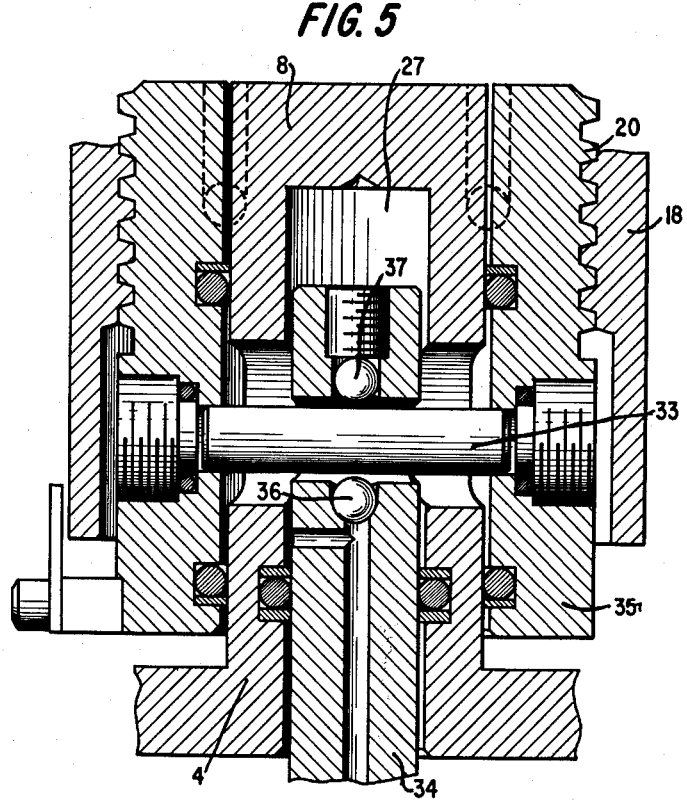
Figure 6:
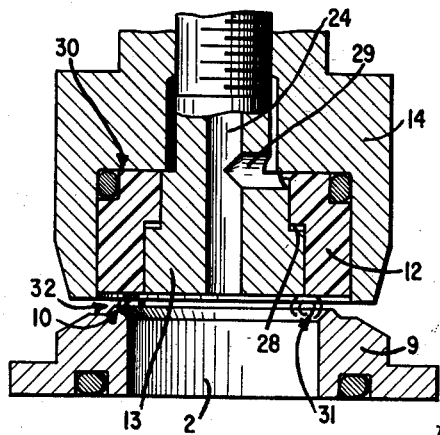

In the drawing:
FIGURE 1 is a side elevation of my balanced globe valve.
FIGURE 2 is a longitudinal sectional view of the same.
FIGURE 3 is an enlarged fragmentary vertical sectional view of the pressurized seat.
FIGURE 4 is a fragmentary vertical sectional view of the stem actuating assembly.
FIGURE 5 is a vertical sectional view of a modified form of stem actuating assembly.
FIGURE 6 is a diagrammatic view of the seat assembly.

Referring more particularly to the drawing, the numeral 1 indicates the body of the valve which includes an intake port 2 and an outlet port 3. A cylinder 4 is fixedly mounted in the body 1 by means of a cover plate 5, this plate in turn being secured to the body 1 by cap screws 6. The cylinder 4 extends vertically into the body 1 and is formed with a vertical bore 7, which bore is open at the bottom and closed at the top by the wall 8. An insert or seat 9 is fixedly mounted in the body 1 and surrounds the intake 2 of the valve. A sharp ring seat 10 is formed on the seat 9 to contact the metal ring of the valve stem, as will be subsequently described. A valve stem 11 extends vertically into the bore 7 of the cylinder 4. A plastic ring seat 12 is nonrotatably mounted in the bottom of the stem 11 by means of the nut 13 which screws into the bottom of the stem 11 and shoulders against the insert 12. The plastic insert 12 is formed of a hard tough plastic, commonly used in valve seats and the like. The plastic insert 12 is mounted in an enlarged head 14 on the lower end of the stem 11, and this head has a limited vertical movement within the enlarged bore 15 in the lower end of the cylinder 4.

To move the stem 11 vertically in order to raise or lower the head 14 relative to its seat 9, I provide a hand wheel 16 which is rotatably mounted on the upper end of the cylinder 4. A thrust bearing 17 may be provided between the hand wheel 16 and the cylinder 4 if desired. An apron 18 depends from the hand wheel 16 and extends downwardly over the cylinder 4. A sleeve 19 surrounds the cylinder 4 adjacent its upper end and the sleeve 19 is coupled to the apron 18 by means of threads 20. Thus when the apron 18 is rotated with the hand wheel 16, the sleeve 19 will move upwardly or downwardly depending upon the rotation of the apron 18. A horizontal pin 21 extends through a drilled hole 22 in the stem 11 and is seated in the sleeve 19, thus moving the stem 11 with the sleeve. Elongated holes 23 in the cylinder 4 permit the pin 21 to move vertically as the sleeve 19 moves.

To balance the upward thrust of the fluid in the intake 2 against the bottom of the stem 11, I provide certain ducts and passages for the movement of fluid so that an equal downward force is exerted on the top of the stem 11, this force being opposite and equal to the upward thrust of the pressure from the intake 2 against the bottom of the stem. A vertical bore 24 extends from the bottom of the stem 11 and thence upwardly into a transverse bore 25. The bore 7 in the cylinder 4 is enlarged as shown at 26, this enlargement extending from the transverse bore 25 and thence upwardly to the chamber 27 into which the upper end of the stem 11 extends. The enlargement 26 also extends around the pin 21 so that the fluid under pressure from the intake 2 can pass upwardly through and around the stem 11 and thence to the chamber 27, where a downward thrust is exerted on the top of the valve stem 11 to balance and oppose the upward thrust of the fluid against the bottom of the stem between the sharp ridges of the ring seat 10. The particular bores and passages previously described permit fluid under pressure to move and exert pressure against both ends of the stem, and still provide a means of engaging that stem and moving the same vertically by the manually actuated hand wheel 16 to raise or lower the insert 12 in the head 14, as might be required to open and close the valve. It is evident that if desired the stem 11 may be enlarged or reduced in diameter, and it is also possible to provide an additional piston or flange on the stem against which the pressure fluid acts to compensate for the upward thrust of the fluid against the bottom of the stem. In valves heretofore in use, to achieve balance it was necessary to utilize auxiliary equipment to counteract the forces on the stem. In my invention any auxiliary systems are eliminated and, furthermore, the valve can be operated by a single operator who can easily operate the valve, and where relatively small manual force is required to open or close the valve even though pressures in excess of 6,000 p.s.i. are exerted on the valve. To accomplish the opening and closing of the valve without losing the balance on the stem 11, I provide the following structure. The insert 12 is pressurized in the following manner:

The insert 12 can move a small distance vertically within the head 14, due to the space 28 between the head of the nut 13 and the insert 12. A port 29 extends from the bore 24 into a space 30 above the plastic insert 12. This permits fluid under pressure to move across the top face of the insert 12 to press the insert downwardly a small distance, and achieve a seating of the insert against the sharp ring seat 10, as will be further described. Referring more particularly to FIGURE 6, as the stem 11 with the insert 12 moves downwardly towards the seat 9, and as the insert 12 reaches a point which is very slightly spaced above the sharp ring seat 10, the following pressure differentials will occur: A localized pressure slightly greater than the line pressure will occur at 31. A reduced pressure zone less than line pressure will occur at 32. This reduced pressure at 32 plus the downward line pressure on the top of the insert 12 will cause that insert to snap downwardly and sharply engage the top of the ring seat 10 to close the valve. Thus the closing of the valve is assisted by the above described pressure differential which reduces the manual force required on the hand wheel 16 and permits closing of the valve with comparatively little force. The opening of the valve will be assisted by the higher pressure in the zone 31, and again comparatively little force will be necessary in opening the valve.

In the modification shown in FIGURE 5 the pin 33 and the stem 34 of the valve are slightly modified in shape, substantially as shown. The pin 33 fits somewhat loosely in the sleeve 35, which sleeve is similar to the sleeve 19. The pin 33 also fits somewhat loosely within the stem 34. Two or more ball bearings 36—37 are arranged within the stem 34 and engage the outside of the pin. The balls 36 and 37 act as a bearing contact and observe both radial and thrust forces between the stem 34 and the pin 33.

It is to be noted that in moving the stem 11 and the insert 12 vertically in the valve, it is not necessary to rotate either the stem or the insert. Rotation occurs in the hand wheel 16 and the apron 18. The sleeve 19, as well as the stem 11, move vertically but do not rotate. Thus the insert 12, which is plastic, can be moved relative to its seat 10 without rotation, which prevents cutting or galling of the seat. It is also to be noted that the cylinder 4 engages and holds the seat 9 in position in the body 1 of the valve, and tightening of the screws 6 will hold the cover plate 5 against the cylinder 4 to hold the cylinder in proper position, and also to retain the seat 9 in its proper position.

While I have described my invention in connection with a nonrotating type of stem, that is, a valve stem which can move longitudinally within the valve but is held against rotation, it is, however, also advisable if desired to use my previously described construction of balancing the stem, as well as utilizing line pressure to hold the valve head insert on its seat in connection with a rotating stem. That is, the construction can be used to balance a stem which rotates with the hand wheel of the valve in order to raise or lower the head and head insert relative to its seat.

Having described my invention, I claim:

1. A balance pressurized seal globe valve, comprising a body, said body having a fluid port including an intake and an outlet port therein, a seat in said fluid port, a stem extending into the body and resting on the seat in one position of the parts, a hand wheel, operating means connecting said hand wheel and stem to move the stem relative to the seat, said body having a bore therein open at the bottom and closed at the top, said bore receiving the stem therein, said stem having a fluid passage therein extending upwardly from the bottom thereof, said bore being enlarged at the upper end of the stem to provide a fluid opening communicating with said fluid passage, said body having a chamber therein into which the upper end of the stem extends, said fluid opening extending into said chamber to exert line pressure on the top of the stem, an insert in the lower end of the stem adapted to rest on said seat in one position of the parts, said insert having a limited vertical movement in the stem, said stem having a pressure space therein and on the top surface of said insert, and said stem having a port extending from said fluid passage and into the pressure space to exert pressure on top of said insert.

2. A balanced pressurized seal globe valve, comprising a body, said body having a fluid port including an intake and an outlet port therein, a seat in said fluid port, a stem extending into the body and resting on the seat in one position of the parts, a hand wheel, a pin extending through the stem and into the body, said pin having a limited vertical movement in the body, a sleeve, said pin being seated in the sleeve, threaded means connecting the sleeve and the hand wheel whereby rotation of the hand wheel will motivate the pin to raise or lower the stem, said body having a bore therein open at the bottom and closed at the top, said bore receiving the stem therein, said stem having a fluid passage therein extending upwardly from the bottom thereof, said bore being enlarged at the upper end of the stem to provide a fluid opening communicating with said fluid passage, said body having a chamber therein into which the upper end of the stem extends, said fluid opening extending into said chamber to exert line pressure on top of the stem, an insert in the lower end of the stem adapted to rest on said seat in one position of the parts, said insert having a limited vertical movement in the stem, said stem having a pressure space therein and on the top surface of said insert, and said stem having a port extending from said fluid passage and into the pressure space to exert pressure on top of said insert.

3. A balance pressurized seal globe valve, comprising a body, said body having a fluid port including an intake and an outlet port therein, a seat in said fluid port, a stem extending into the body and resting on the seat in one position of the parts, a hand wheel, operating means connecting said hand wheel and stem to move the stem relative to the seat, a cylinder fixedly mounted in the body, said cylinder having a bore therein open at the bottom and closed at the top, said bore receiving the stem therein, said stem having a fluid passage therein extending upwardly from the bottom thereof, said bore being enlarged at the upper end of the stem to provide a fluid opening communicating with said fluid passage, said cylinder having a chamber therein into which the upper end of the stem extends, said fluid opening extending into said chamber to exert line pressure on the top of the stem, an insert in the lower end of the stem adapted to rest on said seat in one position of the parts, said insert having a limited vertical movement in the stem, said stem having a pressure space therein and on the top surface of said insert, and said stem having a port extending from said fluid passage and into the pressure space to exert pressure on top of said insert.

4. A balance pressurized seal globe valve, comprising a body, said body having a fluid port including an intake and an outlet port therein, a seat in said fluid port, a stem extending into the body and resting on the seat in one position of the parts, a hand wheel, a cylinder fixedly mounted in said body, means rotatably mounting the hand wheel on the upper end of the cylinder, an apron depending from the hand wheel, a sleeve surrounding the cylinder, threaded means coupling the sleeve and apron whereby rotation of the hand wheel will move the sleeve vertically, a pin extending through the stem and mounted in said sleeve, said cylinder having elongated slots therein to receive the pin, said cylinder having a bore therein open at the bottom and closed at the top, said bore receiving the stem therein, said stem having a fluid passage therein extending upwardly from the bottom thereof, said bore being enlarged at the upper end of the stem to provide a fluid opening communicating with the fluid passage, said body having a chamber therein into which the upper end of the stem extends, said fluid opening extending into said chamber to exert line pressure on top of the stem, an insert in the lower end of the stem adapted to rest on said seat in one position of the parts, said insert having a limited vertical movement in the stem, said stem having a pressure space therein and on the top surface of said insert, and said stem having a port extending from said fluid passage and into the pressure space to exert pressure on top of said insert.

References Cited in the file of this patent

UNITED STATES PATENTS

| | | |
|---|---|---|
| 1,111,244 | Wilson | Sept. 22, 1914 |
| 1,125,596 | Robertshaw | Jan. 19, 1915 |
| 2,152,831 | Williams | Apr. 4, 1939 |
| 2,380,608 | Palm | July 31, 1945 |
| 2,630,292 | Skweir | Mar. 3, 1953 |
| 2,962,039 | Shand | Nov. 29, 1960 |
| 3,036,587 | Silver | May 29, 1962 |